(12) United States Patent
Saucier

(10) Patent No.: US 6,173,737 B1
(45) Date of Patent: Jan. 16, 2001

(54) BIDIRECTIONAL FLOW CONTROL VALVE

(75) Inventor: Stanton Saucier, Tarzana, CA (US)

(73) Assignee: Ricon Corporation, Panorama, CA (US)

( * ) Notice: Under 35 U.S.C. 154(b), the term of this patent shall be extended for 0 days.

(21) Appl. No.: 09/346,446

(22) Filed: Jul. 1, 1999

(51) Int. Cl.⁷ .................................................. G05D 7/01
(52) U.S. Cl. .......................................... 137/504; 137/498
(58) Field of Search .................................. 137/504, 462, 137/498

(56) References Cited

U.S. PATENT DOCUMENTS

| | | | |
|---|---|---|---|
| 2,121,936 | * 6/1938 | Thomas | 137/498 |
| 3,319,648 | * 5/1967 | Donner | 137/504 |
| 3,561,471 | * 2/1971 | Sands | 137/462 |
| 3,683,957 | * 8/1972 | Sands | 137/462 X |
| 3,850,195 | * 11/1974 | Olsson | 137/503 |
| 5,308,215 | 5/1994 | Saucier . | |
| 5,320,135 | 6/1994 | Pierrou . | |
| 5,639,066 | 6/1997 | Lambert et al. . | |

\* cited by examiner

*Primary Examiner*—Stephen M. Hepperle
(74) *Attorney, Agent, or Firm*—Thomas I. Rozsa; Tony D. Chen; Jerry Fong

(57) ABSTRACT

A bidirectional flow control valve for use in a hydraulic system to regulate fluid flow in either direction of flow through the valve. The valve includes a housing, a slidable sleeve, two opposite springs, and two opposite cap nuts. The housing has a bore and a sidewall with first ports located adjacent to one end and second ports located adjacent to the other end. The slidable sleeve has an interior wall disposed therein to form a first chamber and a second chamber. The interior wall has an axial port to permit flow of fluid therethrough. The first spring is disposed within the first chamber of the slidable sleeve and constrained therein by the cap nut. The second spring has the same tension as the first spring and disposed within the second chamber of the slidable sleeve and constrained therein by the cap nut. The slidable sleeve is self-adjustable to an equilibrium position within the valve housing to at least partially open the first and second ports of the valve housing.

22 Claims, 4 Drawing Sheets

BIDIRECTIONAL FLOW CONTROL VALVE

BACKGROUND OF THE INVENTION

1. Field of the Invention

The present invention relates to the field of vehicular wheelchair lifts which enable persons who are physically challenged or otherwise have limited mobility to board and leave a vehicle. More particularly, the present invention relates to the field of flow control valves used in hydraulic systems for vehicular wheelchair lifts or the like.

2. Description of the Prior Art

Specifically, hydraulic vehicular wheelchair lifts are well known in the art. Many of these lifts utilize a hydraulic actuating system with a flow control valve for moving the lift platform between a ground level position to an entry level position and from the entry level position to a stowed position. Furthermore, these lifts are also designed to be gravity-down during the platform movements from the stowed position to the entry level position and from the entry level position to the ground level position.

One of the disadvantages with prior art flow control valves is that they are restricted in one direction. Another disadvantage is that the main orifice port which is used for restricting hydraulic fluid flow has a narrow diameter opening and can get clogged by small particles in the hydraulic fluid. A further disadvantage is that there are three fluid routes in which the hydraulic fluid flows through the flow control valve.

U.S. Pat. No. 5,639,066 issued to Lambert et al. on Jun. 17, 1997 discloses a bidirectional flow control valve. The valve regulates flow in either direction between two ports having a valve with one of the ports formed in the housing at a proximal end and coaxial with the main bore and with a second one of the ports formed in the housing and opening into a side of the bore. A tubular spool is slidably received in the bore, and the spool has a lumen which is coaxial with the first port and a radial opening in the wall of the spool, with an edge of the opening being positioned to wipe across an edge of the second port so as to vary the cross-sectional area of a flow passage between the first and second ports in an area defined between the edges of the opening and of the second port.

U.S. Pat. No. 5,308,215 issued to Saucier on May 3, 1994 discloses a hydraulic drive passenger lift with a flow control structure for accommodating various distinctive motion patterns, including lifting "up and down" (loading and unloading) and "fold and unfold" (storage and deploy) patterns. The flow control arrangement with different attenuation degrees is designed for the purpose of having similar reduced platform movement speeds during the storage phase and the deployment phase of the storage movement pattern. The flow control structure includes multiple paths between a source and an actuator, with control for selecting the appropriate path to yield predetermined flow rates. A solenoid driven spool valve and a biased movable orifice member select the desired path. While the flow is substantially unrestricted during "up and down" movement, it is somewhat restricted for reduced speed during the "unfold" movement and is more restricted during the power-driven "fold" movement.

U.S. Pat. No. 5,320,135 issued to Pierrou on Jun. 14, 1994 discloses a flow compensator valve that is used in a hydraulic system which includes a cylindrical body having inlet and outlet ports, and a slidable spring-biased hollow piston insert disposed within a center bore of the body, which insert has a plurality of ports for flow control depending on the position of the insert as it reciprocates axially within the center bore of the valve body.

It is desirable to provide a hydraulic system with an improved bidirectional flow control valve to eliminate the disadvantages mentioned above. It is also desirable to provide an improved bidirectional flow control valve in which the hydraulic flow can be restricted in either direction of flow of the valve and the relative restricted flow rates may be the same or various.

SUMMARY OF THE INVENTION

The present invention is a bidirectional flow control valve used in a hydraulic system for regulating fluid flow in either direction through the valve and providing the same or various restricted flow rate at either direction of the flow through the valve. The valve comprises a housing, a slidable sleeve, two opposite springs, and two opposite cap nuts. The housing has a central bore and a sidewall with first ports located adjacent to one end and second ports located adjacent to the other end. The slidable sleeve is slidably disposed within the central bore of the housing and movable among a first position, an equilibrium position and a second position. The slidable sleeve has an interior wall disposed therein to form a first chamber and a second chamber. The interior wall has an axial port to permit flow of fluid therethrough. The first spring is disposed within the first chamber of the slidable sleeve and constrained therein by the first cap nut or other suitable means. The second spring is received by the second chamber of the slidable sleeve and constrained therein by the second cap nut or other suitable means.

The slidable sleeve is initially positioned (without any flow pressure) in the equilibrium position within the valve housing which is not blocking both the first and second ports of the valve housing. When hydraulic fluid flows from the first ports to the second ports, the hydraulic fluid pressure in the first chamber of the valve is greater than in the second chamber, the slidable sleeve is biased by the fluid and the first spring moves toward the second position which in turn partially blocks the second ports and restricts the flow from the first chamber of the valve.

The slidable sleeve is automatically adjusted to the equilibrium position where forces applied on two opposite sides of the slidable sleeve are equal to each other due to the unique bidirectional valve. Specifically, as an example, while the slidable sleeve moves toward the second ports, it partially blocks the second ports and restricts the flow from the first chamber. The flow from the first chamber is more restricted if the second port openings are partially obstructed by further movement of the slidable sleeve. The flow pressure in the second chamber will build up to a certain level to automatically push the slidable sleeve back to the equilibrium position so as to maintain the second ports partially open to allow the restricted flow to exit therethrough. Even in the event that the slidable sleeve fully blocks the second ports, thereby preventing the hydraulic fluid from exiting the hollow housing, the slidable sleeve will still automatically move back to the equilibrium position by the second spring. In this way, the second ports are self-adjusting and maintained partially open to allow flow with certain restricted flow amount to exit therethrough. Reversed movements operate when the hydraulic fluid flows from the second ports to the first ports.

As one of the demonstratable embodiments of the invention, the bidirectional flow control valve is applied on one kind of electric-hydraulic controlled wheelchair lift which travels between a stowed position, an entry vehicle floor position and a ground landing position. The flow control valve is mounted in the hydraulic system to have a restricted flow rate during movements of the swing-up movement (from the floor position to the stowed position) and the swing-down movement (from the stowed position to the floor position). The first ports of the housing are connected to a hydraulic actuator means, such as a pump, and the second ports of the housing are connected to a hydraulic moving means, such as a cylinder. One unique feature is that by using the present invention bidirectional flow control valve, the restricted flow rate remains the same regardless of the load changes on the wheelchair lift which leads to many advantages.

The restricted flow rates from either direction of flow through the bidirectional flow control valve may be the same or different upon pre-selection or design and arrangements made in the dimensions of the first and second ports, the first and second chambers, the first and second springs, and the axial port in the slidable sleeve. The first and second springs are preferably selected to be the same to provide the same restricted flow rate in either direction of flow through the valve.

It is an object of the present invention to provide a bidirectional flow control valve to provide a restricted hydraulic flow rate at either direction of flow through the flow control valve.

It is also an object of the present invention to provide a bidirectional flow control valve to create the same restricted flow rate of the hydraulic flow through either direction of flow through the flow control valve.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
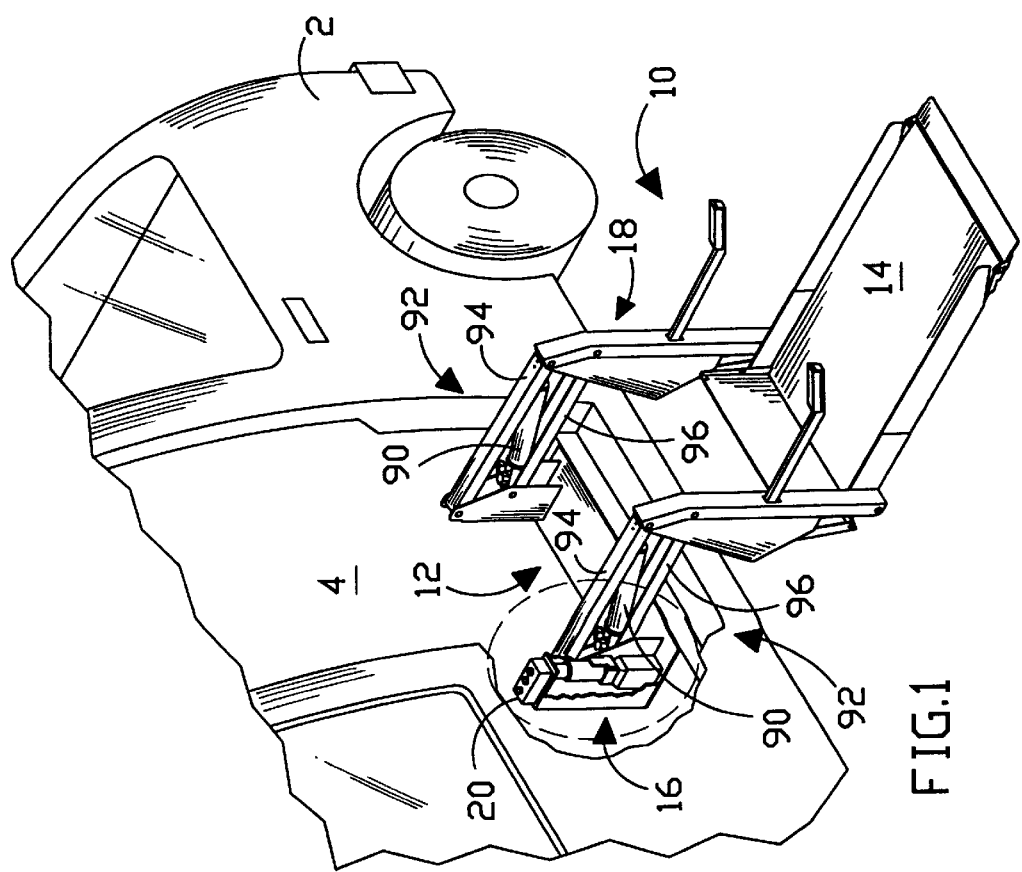
FIG. 1 is a perspective view of a portion of a vehicle carrying a vehicular wheelchair or passenger lift in accordance with the present invention.

Referring to FIG. 1, there is shown a portion of a vehicle 2 carrying a wheelchair or passenger lift 10 for raising a passenger in a wheelchair (not shown) to a position for entering and leaving the vehicle 2. Since the parts of the lift 10 are well known in the art, the description thereof will only be described in general terms.

The lift 10 is installed and fastened to the bed or floor 4 of the vehicle 2 by a mounting assembly 12 which mainly includes an anchoring plate that is secured to the vehicle floor 4 by conventional means. The lift 10 incorporates a platform 14 for receiving a load, a hydraulic system 16 for driving the platform 14, a platform linking mechanism 18, and a control unit 20 for actuating the platform 14 to move from a stowed position inside the vehicle to an entry level position at the vehicle door opening and inversely (i.e., from the entry level position to the stowed position), and moving the platform 14 between the entry level position and a ground level position outside the vehicle and inversely (i.e., from the ground level position to the entry level position).

The hydraulic system 16 includes a pair of opposite hydraulic cylinders 90 respectively mounted on two relative parallelogram linkage structures 92 of the platform linking mechanism 18. Each parallelogram linkage structure 92 may include an upper parallel actuating arm 94, a lower parallel actuating arm 96 and a vertical arm 98. While the present invention is illustrated by a hydraulic system 16 using a pair of hydraulic cylinders 90, it is equally adaptable to a hydraulic system using a single hydraulic cylinder in the present invention. Similarly, while the invention is illustrated by a lift adapted to transport a passenger in a wheelchair, it is equally suitable for transporting passengers using other mobility devices.

Figure 2:
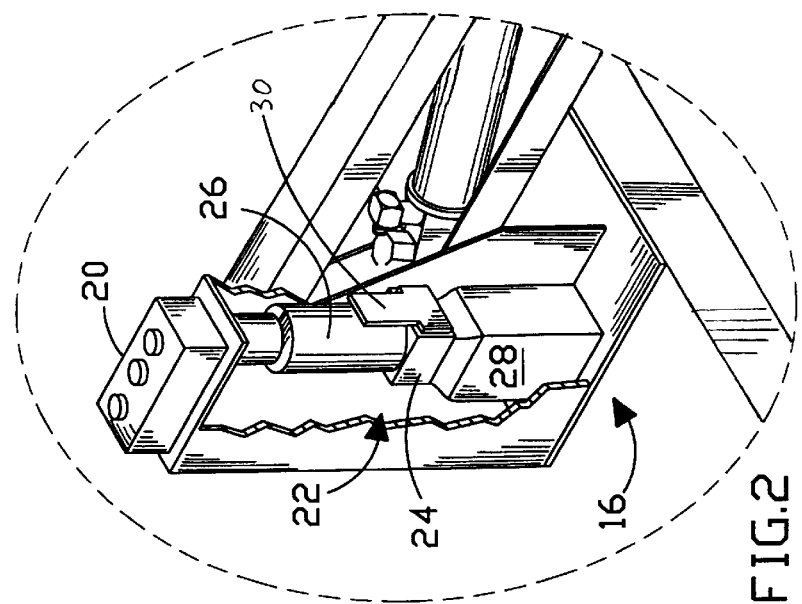
FIG. 2 an enlarged perspective view taken within the dashed lines of FIG. 1.

Referring to FIGS. 1 and 2, the hydraulic system 16 further includes a pump assembly 22 which includes a pump 24 to actuate the hydraulic cylinders 90, a motor 26 to power the pump 24 and a reservoir or tank 28 to supply and accept hydraulic fluid to and from the hydraulic system 16. A fluid passage accommodates fluid flow between the pump assembly 22 and the hydraulic cylinders 90 in forward and reverse directions. Note that the lift is raised under power but lowered under the force of gravity.

Figure 3:
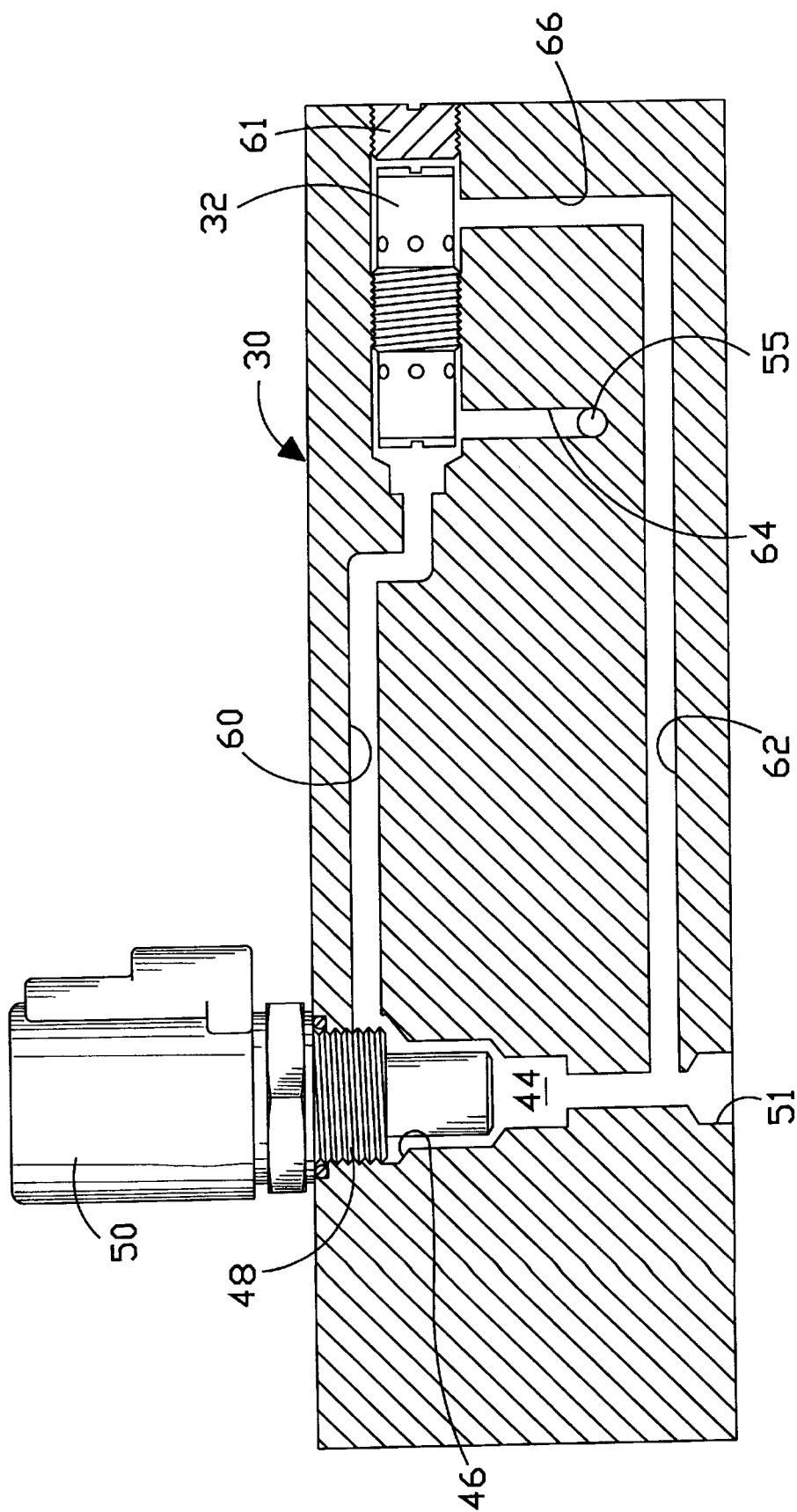
FIG. 3 is a partial cross-sectional view of a hydraulic flow control structure embodied in the lift of FIG. 1.

Referring to FIGS. 2 and 3, turning now to the hydraulic system, the speed control for the platform in the different positions (for example, a ground level position, a vehicle floor level position, and a stowed position) resides in a hydraulic fluid control structure 30 which is part of the pump assembly 22. The present invention bidirectional flow control valve 32 is embedded within the control structure 30 which is coupled between the cylinders 90 and the pump 24 which is with the reservoir 28. The pump 24 is active during stowing and elevating the lift. Note that the control structure 30 is affixed to the pump assembly 22 by conventional means. Essentially, the control structure 30 accommodates fluid flow to enable the platform to move to different positions as required.

Referring to FIG. 3, considering the structure of the control structure 30 in greater detail, a first vertical bore 44 extends through the structure 30 from top to bottom. The top portion of the first vertical bore 44 forms a cavity 46 configured to receive a normally closed spool valve 48 actuated by a solenoid 50. The lower end of the first vertical bore 44 forms a cylinder port 51 that couples with a cylinder line (not shown) to connect the control structure 30 with the hydraulic cylinders 90.

Transverse to the bore 44, a first horizontal bore 60 extends from the cavity 46 to the right-hand side of the control structure 30 as shown and plugged by a threaded plug 61. Below the first horizontal bore 60 and also transverse to the vertical bore 44, a second horizontal bore 62 extends from an area proximate of the lower end of the vertical bore 44 to the right-hand side of the control structure 30 as shown. A second vertical bore 64 which is substantially parallel to the first vertical bore 44 extends from the first horizontal bore 60 and terminates also at the midsection of the structure 30. The bottom end 55 of the second vertical bore 64 connects the control structure 30 to the pump 24 and the reservoir 28. A third vertical bore 66 is also provided and connects the first and second horizontal bores 60 and 62 together.

Figure 4:
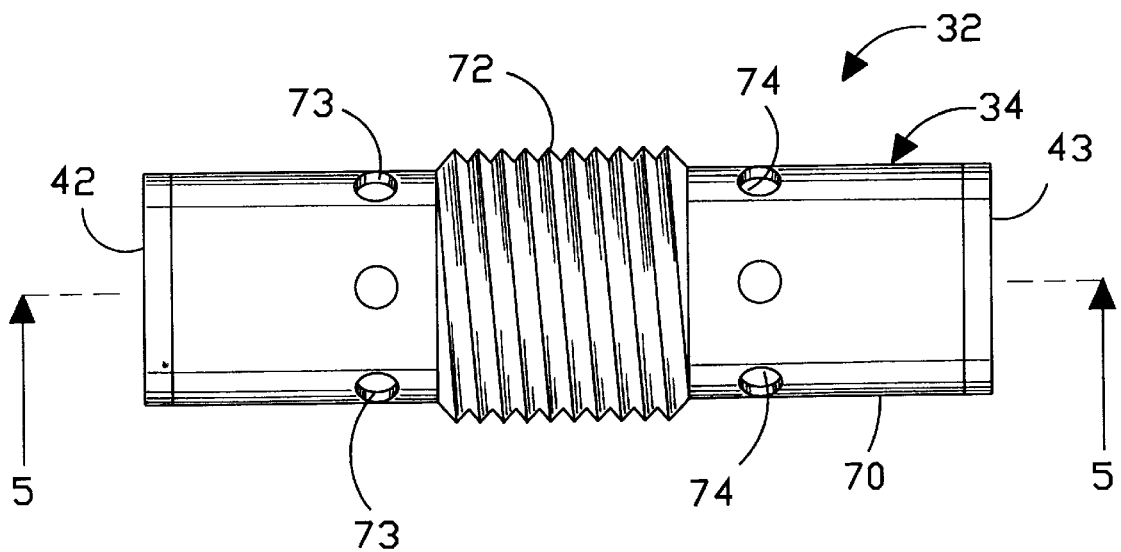
FIG. 4 is an enlarged elevational view of the present invention bidirectional flow control valve.
Figure 5:
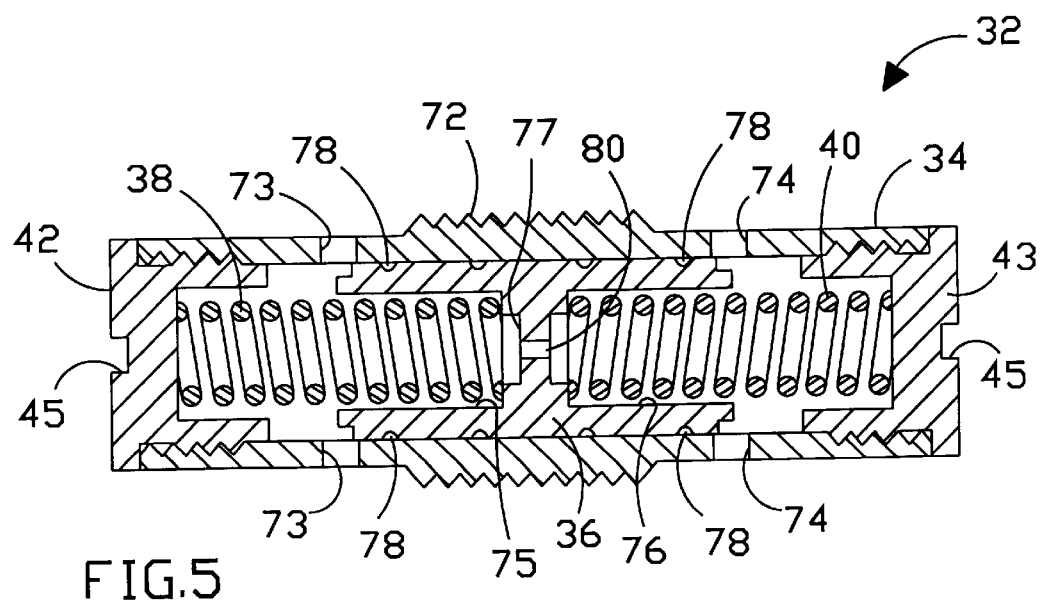
FIG. 5 is a cross-sectional view taken along line 5—5 of FIG. 4.
Figure 6:
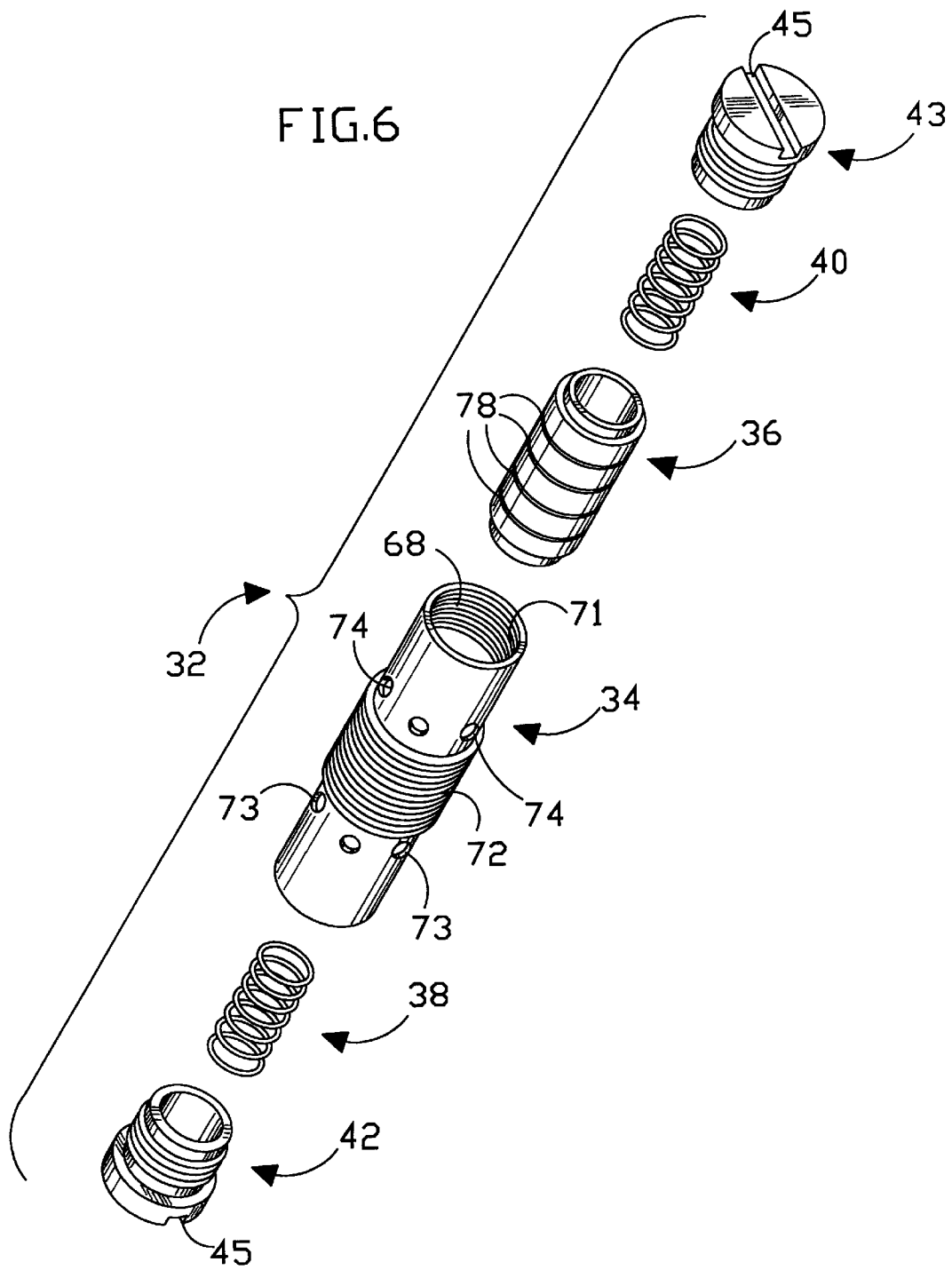
FIG. 6 is an exploded perspective view of the present invention bidirectional flow control valve showing the assembly relationship of the individual components of the valve.

Referring again to FIG. 3, the present invention bidirectional flow control valve 32 is threadedly installed or any other suitable means within the first horizontal bore 60 of the control structure 30 and located between the second and third vertical bores 64 and 66 as shown. Referring to FIGS. 4, 5 and 6, the flow control valve 32 comprises a hollow valve housing or body 34, a movable or slidable cylindrical sleeve 36, two opposite coil springs 38 and 40, and two opposite end cap nuts 42 and 43. The valve housing 34 includes a longitudinal bore hole 68 therethrough for receiving the insertion of the cylindrical sleeve 36 therein and a circumferential sidewall 70. The circumferential sidewall 70 has internal threads 71 at opposite ends of the housing 34, external threads 72 located in the middle of the housing 34, and a plurality of transverse inlet/outlet ports 73 and 74 located at opposite sides of the external threads 72.

The slidable cylindrical sleeve 36 has a cross section which is generally a H-shaped configuration and is formed with two chambers 75 and 76 separated by a transverse interior wall 77. The slidable sleeve 36 includes a plurality of spaced apart fluid-retaining grooves 78 in its exterior sidewall to provide lubrication for movement and reduce sticking due to cocking. Each of the end cap nuts 42 and 43 has a top slot 45 for allowing a driving tool (not shown) to drive the end cap nuts into the valve housing 34. Once the sleeve 36 is installed within the hollow valve housing 34, the two springs 38 and 40 having the same tension strength are respectively inserted into the two chambers 75 and 76, and are respectively constrained therein by the two end cap nuts 42 and 43. The two end cap nuts 42 and 43 are threadedly engaged with the internal threads 71 at opposite ends of the housing 34, respectively, to form the bidirectional flow control valve 32. The transverse interior wall 77 has an axial main port 80 for allowing fluid to flow between the two chambers 75 and 76. Preferably, two springs 38 and 40 are identical compressed springs which have the same tension strength. However, it will be appreciated that the two springs 38 and 40 may have different tension strength which may be also applied in the present invention. The axial main port 80 on the slidable sleeve 36 is the flow restrict port as the dimension of the port 80 is relatively smaller than the inlet and outlet ports 73 and 74. A certain restricted flow rate can be achieved by choosing the proper dimensions of these ports 80, 73 and 74, and the proper springs 38 and 40.

Referring to FIG. 5, there is shown the slidable cylindrical sleeve 36 in its equilibrium position within the valve housing 34. In this position, there is no flow pressure difference between chambers 75 and 76, and the transverse inlet/outlet ports 73 and 74 are not obstructed. Two compressed springs 38 and 40 are biased against the slidable cylindrical sleeve 36 in two opposite directions keeping it in the equilibrium position, such as an initial position, where no flow pressure is through the valve system 32.

Referring to FIGS. 3, 4, 5, and 6, for deployment of the platform from the stowed position to the entry position, the spool valve 48 is closed. The motor pump is deactivated, the fluid travels from the cylinder port 51 to the pump port 55 by the gravity weight of the platform. As the fluid enters the flow control valve 32 through the transverse inlet/outlet ports 73 and 74, the flow pressure in the chamber 76 is greater than in the chamber 75 thus pushing the slidable sleeve 36 against the spring 38 moving away from the initial position (to the left in this case). The fluid flow from the chamber is restricted through the axial port 80 on the slidable sleeve 36 as the dimension of the port 80 is much smaller then that of the inlet/outlet ports 73 and 74, and the ports 73 are partially closed. The ports 73 here conducted as the flow exiting ports are kept partially open by the spring force of the spring 38. If the ports 73 are fully blocked by the slidable sleeve 36, the flow pressure in the chamber 75 will build up to a certain pressure level. Consequently, the slidable sleeve 36 will be pushed back to at least partially open the ports 73 by the flow pressure and the spring 38. In other words, the flow from ports 74 is continuously restricted and exiting from the ports 73. Alternatively, there may be two separate stoppers (not shown) mounted on the housing of the valve to keep the ports 73 and 74 from being fully closed.

When the platform is moved from the entry position to the stowed position, the spool valve 48 is closed and the pump motor is activated, the fluid is subjected to have relatively higher pressure in the pump port 55 than the cylinder port 51. The fluid flow is restricted through the flow control valve 32, port 80 from inlet/outlet ports 73 to ports 74 to push the slidable sleeve 36 moving away from the equilibrium position (to the right in this case). The ports 74 here act as the exiting ports and are maintained open. If the ports 74 are fully blocked by the slidable sleeve 36, the flow pressure in the chamber 76 will be built up to reach a threshold pressure level. As a result, the slidable sleeve 36 will be pushed back to open the ports 74 by the flow pressure and the spring 40 thus the flow from the ports 73 is restricted and continuously flowed through the ports 74.

When the platform is moved between the entry and floor ground positions to raise and lower the lift, the spool valve 48 is opened and the hydraulic flow between the pump and the cylinders is by passed the flow control 32 so that no flow restriction occurs.

The present invention conforms to conventional forms of manufacture or any other conventional way known to one skilled in the art.

Defined in detail, the present invention is a bidirectional flow control valve used in conjunction with a hydraulic system having a pump and at least one hydraulic cylinder for regulating fluid flow in either direction of flow through the control valve, the control valve comprising: (a) a hollow valve housing having a longitudinal central bore and a circumferential sidewall, the circumferential sidewall having a plurality of first and second ports located remote from each other; (b) a slidable cylindrical sleeve slidably disposed within the central bore of the housing and movable between a first position, an equilibrium position and a second position, the slidable sleeve having a transverse interior wall centrally disposed therein to form a first chamber and a second chamber, the transverse interior wall having an axial port to permit flow of fluid therethrough; (c) a first spring disposed within the first chamber of the slidable sleeve and constrained therein by a first end cap nut which is threadedly engaged with one end of the valve housing; (d) a second spring disposed within the second chamber of the slidable sleeve and constrained therein by a second end cap nut which is threadedly engaged with the other end of the valve housing, where the slidable sleeve is positioned in the equilibrium position, such that the plurality of first and second ports are at least partially opened; (e) when hydraulic fluid flows into the first chamber of the valve housing through the plurality first ports and then through the axial port causing the slidable sleeve to move to the second position which in turn at least partially obstructs the plurality of second ports and restricts the hydraulic fluid flow from existing the second chamber and passes to the at least one hydraulic cylinder; and (f) when hydraulic fluid flows into the second chamber of the valve housing through the plurality of second ports and then through the axial port causing the slidable sleeve to move to the first position which in turn at least partially obstructs the plurality of first ports and restricts the hydraulic fluid from existing the first chamber and into the pump; (g) whereby the fluid flow rate is the same in either direction through the bidirectional flow control valve.

Defined broadly, the present invention is a bidirectional flow control valve used in conjunction with a hydraulic system having a pump and at least one hydraulic cylinder for regulating fluid flow in either direction of flow through the control valve, the flow control valve comprising: (a) a hollow housing having a central bore and a sidewall, the sidewall having a plurality of first ports located adjacent to one end of the hollow housing and a plurality of second ports located adjacent to the other end of the hollow housing; (b) a slidable sleeve slidably disposed within the central bore of the housing and movable therein, the slidable sleeve having an interior wall which forms a first chamber and a second chamber, the interior wall having an orifice thereto to permit flow of fluid therethrough; (c) first spring means disposed within the first chamber of the slidable sleeve and constrained therein; (d) second spring means disposed within the second chamber of the slidable sleeve and constrained therein, such that the slidable sleeve is positioned in an optimum position within the housing, where the plurality of first and second ports are at least partially opened; (e) when fluid flows into the first chamber of the valve through the plurality of first ports and then through the orifice of the slidable sleeve causing the slidable sleeve to move, thereby at least partially obstructing the plurality of second ports and restricts the fluid from existing the second chamber and passes to the at least one hydraulic cylinder; and (f) when fluid flows into the second chamber of the valve through the plurality of second ports and then through the orifice of the slidable sleeve causing the slidable sleeve to move, thereby at least partially obstructing the plurality of first ports and restricts the fluid from existing the first chamber and into the pump; (g) whereby the fluid flow rate is restricted in either direction of flow through the bidirectional flow control valve.

Defined more broadly, the present invention is a bidirectional control valve for regulating fluid flow in either direction of flow through the control valve, comprising: (a) a housing having a bore and at least two ports located remote from each other; (b) a movable sleeve disposed within the bore of the housing and having an interior wall forming a first chamber which communicates with a respective one of the at least two ports and a second chamber which communicates with the respective one of the at least two ports, the interior wall having an orifice thereto to permit flow of fluid therethrough; (c) means for biasing the movable sleeve within the bore of the housing, where the sleeve is self-adjustable to an equilibrium position such that the respective one of the at least two ports is at least partially opened; (d) when fluid flows into the first chamber through the respective one of the at least two ports and then through the orifice causing the movable sleeve to move, thereby at least partially obstructing the respective one of the at least two ports and restricts the fluid from existing the second chamber; and (e) when fluid flows into the second chamber through the respective one of the at least two ports and then through the orifice causing the movable sleeve to move, thereby at least partially obstructing the respective one of the at least two ports and restricts the fluid from existing the first chamber; (f) whereby the fluid flow rate is restricted in either direction of flow through the bidirectional control valve.

Defined even more broadly, the present invention is a control valve for regulating fluid flow in either direction of flow through the valve, comprising: (a) a housing having a bore and at least two ports located remote from each other; (b) a movable sleeve disposed within the bore of the housing and having a wall forming a first chamber which communicates with a respective one of the at least two ports and a second chamber which communicates with the respective one of the at least two ports, the wall having an orifice thereto to permit flow of fluid therethrough; and (c) means for biasing the movable sleeve within the housing where the sleeve is self-adjustable to an equilibrium position such that the respective one of the at least two ports is at least partially open, when fluid flows in either direction of the valve between the first chamber and the second chamber through the respective one of the at least two ports in connection with the orifice; (d) whereby the fluid flow rate is restricted in either direction of flow through the control valve.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

What is claimed is:

1. A control valve for regulating fluid flow in either direction of flow through the valve, comprising:
   a. a housing having a bore and at least two ports located remote from each other;
   b. a movable sleeve disposed within said bore of said housing and having a wall forming a first chamber which communicates with one of said at least two ports and a second chamber which communicates with the other one of said at least two ports, the wall having an orifice thereto to permit flow of fluid therethrough;
   c. means for biasing said movable sleeve within said housing where said sleeve is self-adjustable to an equilibrium position such that said at least two ports are at least partially open, and when fluid flows in either direction of said valve and then through said orifice causing said movable sleeve to move, thereby at least partially obstructing either one of said at least two ports and restricts the fluid flow between said first and second chambers; and
   d. said biasing means including two spring means respectively disposed within said first and second chambers, each spring means having a different tension strength to provide different fluid flow rates in either direction flow through said control valve;
   e. whereby the fluid flow rate is restricted in either direction of flow through said control valve.

2. The valve in accordance with claim 1, wherein the dimension of said orifice of said movable sleeve is smaller than the dimensions of said at least two ports of said housing.

3. The valve in accordance with claim 1, wherein said housing further includes exterior threads located between said at least two ports for threadedly installing into a structure.

4. The valve in accordance with claim 1, wherein said movable sleeve includes a plurality of spaced apart fluid-retaining grooves in its exterior sidewall to provide lubrication for movement and reduce sticking.

5. A bidirectional control valve for regulating fluid flow in either direction of flow through the control valve, comprising:
   a. a housing having a bore and at least two ports located remote from each other;
   b. a movable sleeve disposed within said bore of said housing and having an interior wall forming a first chamber which communicates with one of said at least two ports and a second chamber which communicates with the other one of said at least two ports, the interior wall having an orifice thereto to permit flow of fluid therethrough;
   c. means for biasing said movable sleeve within said bore of said housing, where said sleeve is self-adjustable to an equilibrium position such that said at least two ports are at least partially opened;
   d. said biasing means includes two spring means respectively disposed within said first and second chambers, each spring means having a different tension strength to provide different fluid flow rates in either direction of flow through said bidirectional control valve;
   e. when fluid flows into said first chamber through one of said at least two ports and then through said orifice causing said movable sleeve to move, thereby at least partially obstructing the other one of said at least two ports and restricts the fluid from existing said second chamber; and
   f. when fluid flows into said second chamber through one of said at least two ports and then through said orifice causing said movable sleeve to move, thereby at least partially obstructing the other one of said at least two ports and restricts the fluid from existing said first chamber;
   g. whereby the fluid flow rate is restricted in either direction of flow through said bidirectional control valve.

6. The control valve in accordance with claim 5, wherein the dimension of said orifice of said movable sleeve is smaller than the dimensions of said at least two ports of said housing.

7. The control valve in accordance with claim 5, wherein said housing further includes exterior threads located between said at least two ports for threadedly installing into a structure.

8. The control valve in accordance with claim 5, wherein said movable sleeve includes a plurality of spaced apart fluid-retaining grooves in its exterior sidewall to provide lubrication for movement and reduce sticking due to cocking.

9. A bidirectional flow control valve used in conjunction with a hydraulic system having a pump and at least one hydraulic cylinder for regulating fluid flow in either direction of flow through the control valve, the flow control valve comprising:
   a. a hollow housing having a central bore and a sidewall, the sidewall having a plurality of first ports located adjacent to one end of the hollow housing and a plurality of second ports located adjacent to the other end of the hollow housing;
   b. a slidable sleeve slidably disposed within said central bore of said housing and movable therein, the slidable sleeve having an interior wall which forms a first chamber and a second chamber, the interior wall having an orifice thereto to permit flow of fluid therethrough;
   c. first spring means disposed within said first chamber of said slidable sleeve and constrained therein;
   d. second spring means disposed within said second chamber of said slidable sleeve and constrained therein, such that said slidable sleeve is positioned in an optimum position within said housing, where said plurality of first and second ports are at least partially opened;
   e. when fluid flows into said first chamber of said valve through said plurality of first ports and then through said orifice of said slidable sleeve causing said slidable sleeve to move, thereby at least partially obstructing said plurality of second ports and restricts the fluid from existing said second chamber and passes to the at least one hydraulic cylinder; and
   f. when fluid flows into said second chamber of said valve through said plurality of second ports and then through said orifice of said slidable sleeve causing said slidable sleeve to move, thereby at least partially obstructing said plurality of first ports and restricts the fluid from existing said first chamber and into the pump;
   g. whereby the fluid flow rate is restricted in either direction of flow through said bidirectional flow control valve.

10. The control valve in accordance with claim 9, wherein the dimension of said orifice of said slidable sleeve is smaller than the dimensions of said plurality of first and second ports of said housing.

11. The control valve in accordance with claim 9, wherein said first and second spring means, each having the same tension strength to provide the same fluid flow rate in either direction of flow through said control valve.

12. The control valve in accordance with claim 9, wherein said first and second spring means, each having different tension strength to provide different fluid flow rates in either direction of flow through said control valve.

13. The control valve in accordance with claim 9, wherein said sidewall of said housing further includes exterior threads located between said plurality of first and second ports for threadedly installing into a structure.

14. The control valve in accordance with claim 9, wherein said slidable sleeve includes a plurality of spaced apart fluid-retaining grooves in its exterior sidewall to provide lubrication for movement and reduce sticking due to cocking.

15. The control valve in accordance with claim 9, further comprising a first end cap nut which is threadedly engaged with one end of said hollow housing to seal said first chamber.

16. The control valve in accordance with claim 9, further comprising a second end cap nut which is threadedly engaged with the other end of said hollow housing to seal said second chamber.

17. A bidirectional flow control valve used in conjunction with a hydraulic system having a pump and at least one hydraulic cylinder for regulating fluid flow in either direction of flow through the control valve, the control valve comprising:

a. a hollow valve housing having a longitudinal central bore and a circumferential sidewall, the circumferential sidewall having a plurality of first and second ports located remote from each other;

b. a slidable cylindrical sleeve slidably disposed within said central bore of said housing and movable between a first position, an equilibrium position and a second position, the slidable sleeve having a transverse interior wall centrally disposed therein to form a first chamber and a second chamber, the transverse interior wall having an axial port to permit flow of fluid therethrough;

c. a first spring disposed within said first chamber of said slidable sleeve and constrained therein by a first end cap nut which is threadedly engaged with one end of said valve housing;

d. a second spring disposed within said first spring and disposed within said second chamber of said slidable sleeve and constrained therein by a second end cap nut which is threadedly engaged with the other end of said valve housing, where said slidable sleeve is positioned in said equilibrium position, such that said plurality of first and second ports are at least partially opened;

e. when hydraulic fluid flows into said first chamber of said valve housing through said plurality first ports and then through said axial port causing said slidable sleeve to move to said second position which in turn at least partially obstructs said plurality of second ports and restricts the hydraulic fluid flow from existing said second chamber and passes to the at least one hydraulic cylinder; and f. when hydraulic fluid flows into said second chamber of said valve housing through said plurality of second ports and then through said axial port causing said slidable sleeve to move to said first position which in turn at least partially obstructs said plurality of first ports and restricts the hydraulic fluid from existing said first chamber and into the pump;

g. whereby the fluid flow rate is the same in either direction of flow through said bidirectional flow control valve.

18. The control valve in accordance with claim 17, wherein the dimension of said orifice of said slidable cylindrical sleeve is smaller than the dimensions of said plurality of first and second ports of said housing.

19. The control valve in accordance with claim 17, wherein said first and second springs, each having the same tension strength to provide the same fluid flow rate in either direction of flow through said control valve.

20. The control valve in accordance with claim 17, wherein said first and second springs, each having different tension strength to provide different fluid flow rates in either direction of flow through said control valve.

21. The control valve in accordance with claim 17, wherein said circumferential sidewall of said housing further includes exterior threads located between said plurality first and second ports for threadedly installing into a structure.

22. The control valve in accordance with claim 17, wherein said slidable cylindrical sleeve includes a plurality of spaced apart fluid-retaining grooves in its exterior sidewall to provide lubrication for movement and reduce sticking due to cocking.

* * * * *